United States Patent [19]

Arikawa

[11] Patent Number: 4,793,662
[45] Date of Patent: Dec. 27, 1988

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 157,323

[22] Filed: Feb. 17, 1988

[30] Foreign Application Priority Data

Feb. 18, 1987 [JP] Japan .................. 62-036654

[51] Int. Cl.⁴ .................. B60T 8/82; B60T 8/62; B60T 8/64; B60T 17/18
[52] U.S. Cl. .................. 303/96; 188/181 C; 303/97; 303/98; 303/99; 303/100; 303/110; 303/111; 303/119; 303/92; 364/426.02
[58] Field of Search .................. 303/91–119, 303/61–63, 68–69, 10–12, DIGS. 1–4; 188/181 A, 181 C, 181 T, 181 R; 180/197, 244; 364/426

[56] References Cited

U.S. PATENT DOCUMENTS

| 3,674,317 | 7/1972 | Mangold | 303/21 F |
|---|---|---|---|
| 3,980,346 | 9/1976 | Leiber | 303/6 R |
| 4,033,637 | 7/1977 | Leiber | 303/115 |
| 4,229,049 | 10/1980 | Ando | 303/6 C |
| 4,418,966 | 12/1983 | Hattwig | 303/100 |
| 4,421,362 | 12/1983 | Shirai et al. | 303/115 |
| 4,439,832 | 3/1984 | Sato et al. | 364/426 |
| 4,451,096 | 5/1984 | Gygax | 303/109 |
| 4,630,871 | 12/1986 | Imoto et al. | 303/113 |
| 4,637,664 | 1/1987 | Arikawa | 303/111 |
| 4,740,040 | 4/1988 | Arikawa | 303/111 X |
| 4,744,610 | 5/1988 | Arikawa | 303/111 X |
| 4,753,493 | 6/1988 | Arikawa | 303/110 |

FOREIGN PATENT DOCUMENTS 2182109 5/1987 United Kingdom .
2191553 12/1987 United Kingdom .
2194825 3/1988 United Kingdom .

Primary Examiner—Douglas C. Butler
Attorney, Agent, or Firm—James P. Ryther

[57] ABSTRACT

An anti-skid control apparatus for a vehicle braking system includes first and second fluid pressure control valve devices for controlling the brake fluid pressure of the wheel cylinders of the front and rear wheels each arranged between respective fluid pressure generating chamber of a tandem master cylinder and the associated wheel cylinder of the associated front or rear wheel; first and second wheel speed sensors associated with the front or rear wheels, respectively; and a third wheel speed sensor associated in common with the rear or front wheels. The control unit discriminates the frictionally lower one of the sides of the road on which the wheels are running, from the measuring or judging results of the skid conditions of the rear and front wheels, or of the front or rear wheels on the basis of the outputs of the first, second and third wheel speed sensors, or of the first and second wheel speed sensors, the low side being able to change over in accordance with said measuring or judging results at any time, combines logically the measuring or judging results of the skid conditions of the rear or front wheels with the measuring or judging result of the skid condition of the one front or rear wheel running on the low side for generating the instruction for controlling the first or second fluid pressure control valve device, and generates the instruction for controlling the second or first fluid pressure control valve device.

16 Claims, 8 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent the locking of the wheels, and more particularly to an anti-skid control apparatus which controls brake pressures to the wheel cylinders in accordance with the skid conditions of the wheels.

This applicant proposed previously the anti-skid control apparatus in the Japanese Patent Application No. 134665 (U.S. Ser. No. 57,802 filed June 3, 1987, now U.S. Pat. No. 4,740,040) in order to provide an anti-skid control apparatus for a vehicle braking system which can be small-sized and light, and can avoid the fear of locking of rear wheels in any cases. In the above apparatus, two fluid pressure control valve devices are used (so-called "2-channel"), and wheel speed sensors are provided for the respective wheels, which are four. And it is decided from the judging results of the skid conditions of the rear wheels which side of the road, on which the wheels are running, is frictionally lower between the sides of the road.

It is considered that the number of the wheel speed sensors is reduced to three for reducing further the cost of the apparatus. The number of the labors for assembling and mounting the wheel speed sensors can be reduced with the reduction of the number of the wheel speed sensors to be provided, too. However, when the wheel speed sensors are three, there occurs the following inconvenience.

When wheel speed sensors are provided for the front wheels respectively, and one common wheel speed sensor is provided on a differential mechanism (rear differential) for the rear wheels which is arranged in a rear axle for connecting the rear wheels, it is difficult to detect the rotational speed difference between the rear wheels and it is impossible to decide the frictionally low side of the road by the prior art method. Or when wheel speed sensors are provided for the rear wheels respectively, and one common wheel speed sensor is provided on a differential mechanism (front differential) for the front wheels which is arranged in a front axle for connecting the front wheels, it is difficult to detect the rotational speed difference between the front wheels, although the rotational speed difference can be detected between the rear wheels. However, the low side cannot be decided from both of the rear wheels and of the front wheels by the prior art method.

SUMMARY OF THE INVENTION

Accordingly, it is an object of this invention to provide an anti-skid control apparatus for a vehicle braking system in which wheel speed sensors are three and which can be small-sized and light, and can avoid the fear of locking of all wheels in any cases.

In accordance with an aspect of this invention, an anti-skid control apparatus for a vehicle braking system comprising (A) a pair front wheels, and a pair of rear wheels; (B) a first fluid pressure control valve device for controlling the brake fluid pressure of the wheel cylinder of one of said front wheels, arranged between a first fluid pressure generating chamber of a tandem master cylinder and said wheel cylinder of the one front wheel; (C) a second fluid pressure control valve device for controlling the brake fluid pressure of the wheel cylinder of another of said front wheels arranged between second fluid pressure generating chamber of said tandem master cylinder and said wheel cylinder of the other front wheel; (D) a first path which transmits the brake fluid pressure controlled by said first fluid pressure control valve device, to the wheel cylinder of the one of said rear wheels connected diagonally to said one front wheel; (E) a second path which transmitts the brake fluid pressure controlled by said second fluid pressure control valve device, to the wheel cylinder of the other of said rear wheels connected diagonally to said the front wheel; (F) first and second wheel speed sensors associated with said front wheels, respectively; (G) a third wheel speed sensors associated in common with said rear wheels, and (H) a control unit receiving outputs of said first, second and third wheel speed sensors for measuring or judging the skid conditions of said front and rear wheels and for generating instructions for controlling said first and second fluid pressure control valve devices; wherein said control unit discriminates the frictionally lower one (designated as "low side") of the sides of the road on which said wheels are running, from the measuring or judging results of the skid conditions of said rear and front wheels, or of said front wheels on the basis of the outputs of said first, second and third wheel speed sensors, or of said first and second wheel speed sensors, said low side being able to change over in accordance with said measuring or judging results at any time, combines logically the measuring or judging results of the skid conditions of said rear wheels with the measuring or judging result of the skid condition of the one front wheel running on the low side for generating the instruction for controlling said first or second fluid pressure control valve device, and generates the instruction for controlling said second or first fluid pressure control valve device, on the basis of the measuring or judging results of the skid condition of the other front wheel running on the high side (frictionally higher side) independently of those of said rear wheels.

In accordance with another aspect of this invention, an anti-skid control apparatus for a vehicle braking system comprising (A) a pair front wheels, and a pair of rear wheels; (B) a first fluid pressure control valve device for controlling the brake fluid pressure of the wheel cylinder of one of said rear wheels, arranged between a first fluid pressure generating chamber of a tandem master cylinder and said wheel cylinder of the one rear wheel; (C) a second fluid pressure control valve device for controlling the brake fluid pressure of the wheel cylinder of another of said rear wheels, arranged between a second fluid pressure generating chamber of said tandem master cylinder and said wheel cylinder of the other rear wheel; (D) a first path which transmits the brake fluid pressure controlled by said first fluid pressure control valves device, to the wheel cylinder of the one of said front wheels connected diagonally to said one rear wheel; (E) a second path which transmits the brake fluid pressure controlled by said second fluid pressure control valve device, to the wheel cylinder of the other of said front wheels connected diagonally to said other rear wheel; (F) first and second wheel speed sensors associated with said rear wheels, respectively; (G) a third wheel speed sensor associated in common with said front wheels, and (H) a control unit receiving outputs of said first, second and third wheel speed sensors for measuring or judging the skid conditions of said front and rear wheels and for generating instructions for controlling said first and second fluid pressure control valve devices; wherein said control unit discriminates the frictionally lower one (designated as "low side") of the sides of the road on which said wheels are running, from the measuring or judging results of the skid conditions of said rear and front wheels, or of said rear wheels on the basis of the outputs of said first, second and third wheel speed sensors, or of said first and second wheel speed sensors, said low side being able to change over in accordance with side measuring or judging results at any time, combines logically the measuring or judging results of the skid conditions of said front wheels with the measuring or judging result of the skid condition of the one rear wheel running on the low side for generating the instruction for controlling said first or second fluid pressure control valve device, and generates the instruction for controlling said second or first fluid pressure control valve device, on the basis of the measuring of judging result of the skid condition of the other rear wheel running on the high side (frictionally higher side) independently of those of said front wheels.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
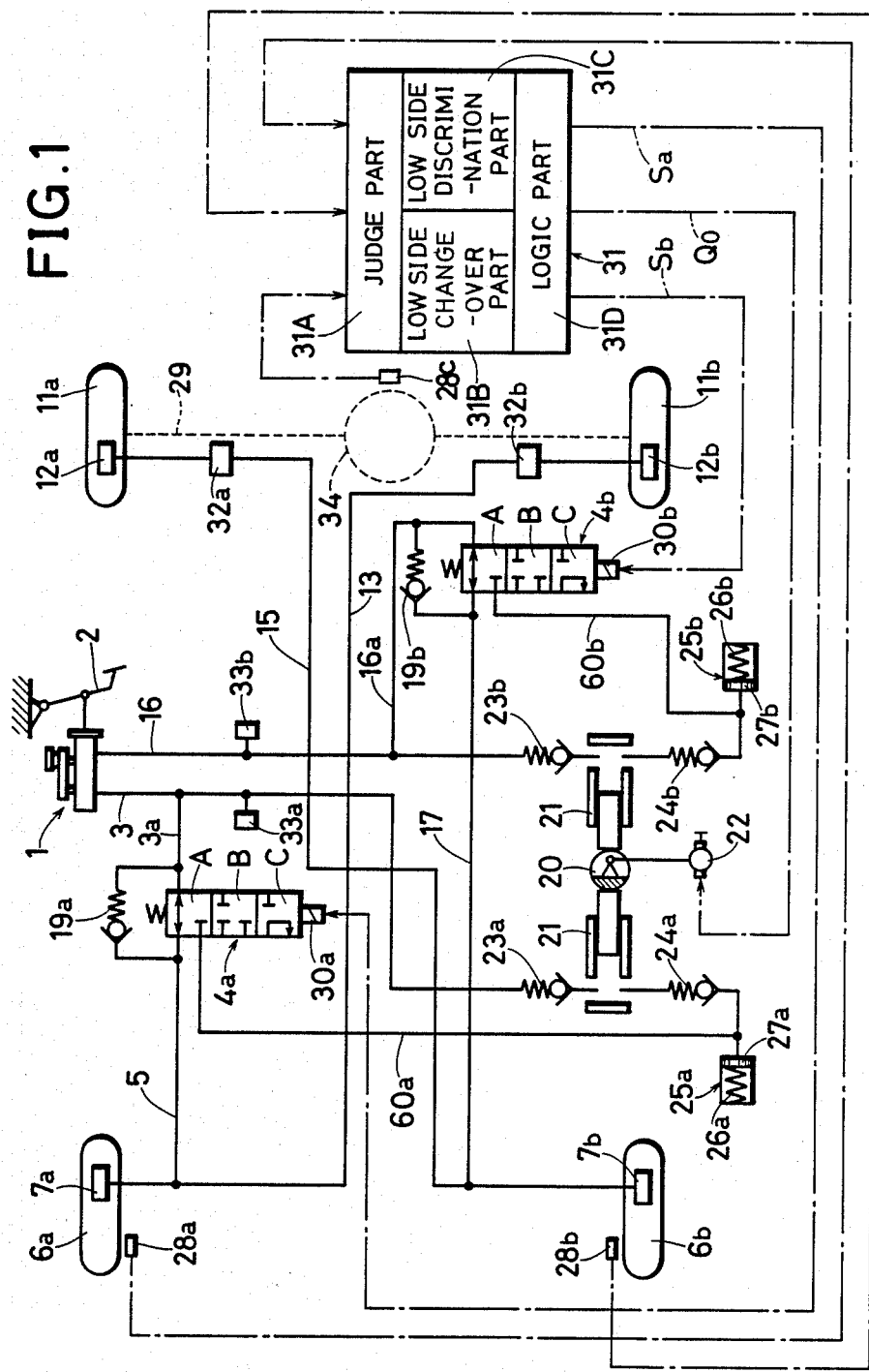
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic three position valve device 4b and a conduit 17. The conduit 17 is further connected to a wheel cylinder 12a of a right rear wheel 11a through a conduit 15 and a proportional valve 32a. Discharge openings of the valves 4a and 4b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Dumpers 33a and 33b are further connected to the conduits 3 and 16 at the discharging sides of the pump 20. It can be avoided much by the dumpers 33a and 33b that the pulsation of the pump 20 is transmitted to the master cylinder 1.

A differential gear mechanism 34 is arranged in a rear axle 29, as shown by the dash-lines in FIG. 1, which combines the rear wheels 11a, 11b. Thus, the automobile of this embodiment is a rear-drive car.

Wheel speed sensors 28a, 28b, and 28c are associated with the wheels 6a, 6b, and the differential gear mechanism 34, respectively, and they generate pulse signals having frequencies proportional to the rotational speeds of the wheels 6a, 6b, and to the rotational speed of the differential gear mechanism 34 which is nearly equal to the mean rotational speed of the rear wheels 11a and 11b, respectively. The pulse signals of the wheel speed sensors. 28a, 28b and 28c are supplied to a control unit 31 according to this invention.

Although described hereinafter in detail, the control unit 31 consists of a judge part 31A, a low-side discrimination part 31B, a low side change-over part 31C and a logic part 31D. Output terminals of the wheels speed sensors 28a, 28b, and 28c are connected to input terminals of the judge part 31A. The judge part 31A receives the wheel speed signals, judges them and supplies the judge results to the low-side discrimination part 31B, the low-side change-over part 31C and the logic part 31D. As will be hereinafter described, the outputs of the low side change-over part 31C and the judge results are logically combined with each other in the logic part 31D. Control signals Sa and Sb, and motor drive signals Qo as the calculation or measurement results are generated from the control unit 31, and are supplied to solenoid portions 30a and 30b of the valve devices 4a and 4b and motor 22, respectively. Dash lines represent electric lead wires.

Although schematically shown, the electro magnetic valves devices 4a and 4b have well-known constructions.

The valve devices 4a and 4b take anyone of three positions A, B and C in accordance with the current intensities of the control signals Sa and Sb.

When the control signals Sa and Sb are "0" in current level, the valve devices 4a and 4b take first positions A for increasing the brake pressure to the brake for the wheel, respectively. In the first position A, the master cylinder side and the wheel cylinder side are made to communicate with each. When the control signals Sa and Sb are "½" in current level, the valve devices 4a and 4b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a and 4b take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates the drive signal Qo for the motor 22. When any one of the control signals Sa and Sb becomes initially "1", the drive signal Qo is generated, and it is kept during the skid control operation. The drive signal Qo is supplied to the motor 22.

In FIG. 1, check valves 19a and 19b are connected in parallel with the electro magnetic valve devices 4a and 4b. They permit brake fluid to flow only in the direction from the wheel cylinder side towards the master cylinder side. Both sides of the valve devices 4a and 4b communicate with each other through throttling holes in the A- positions. Accordingly, pressurized fluid is rapidly returned through the check valves 19a and 19b to the master cylinder 1 from the wheel cylinders 7a, 7b, 12a and 12b, when the brake is released.

Or when the brake pedal 2 is released from treading in the B or C-positions of the valve devices 4a and 4b during the skid control, the brake fluid can be returned from the wheel cylinder side to the master cylinder side through the check valves 19a and 19b.

The pressure reducing proportional valves 32a and 32b have the well-known constructions. When the fluid pressure at the input side becomes higher than a predetermined value, it is reduced at a predetermined rate and transmitted to the output side.

Figure 2:
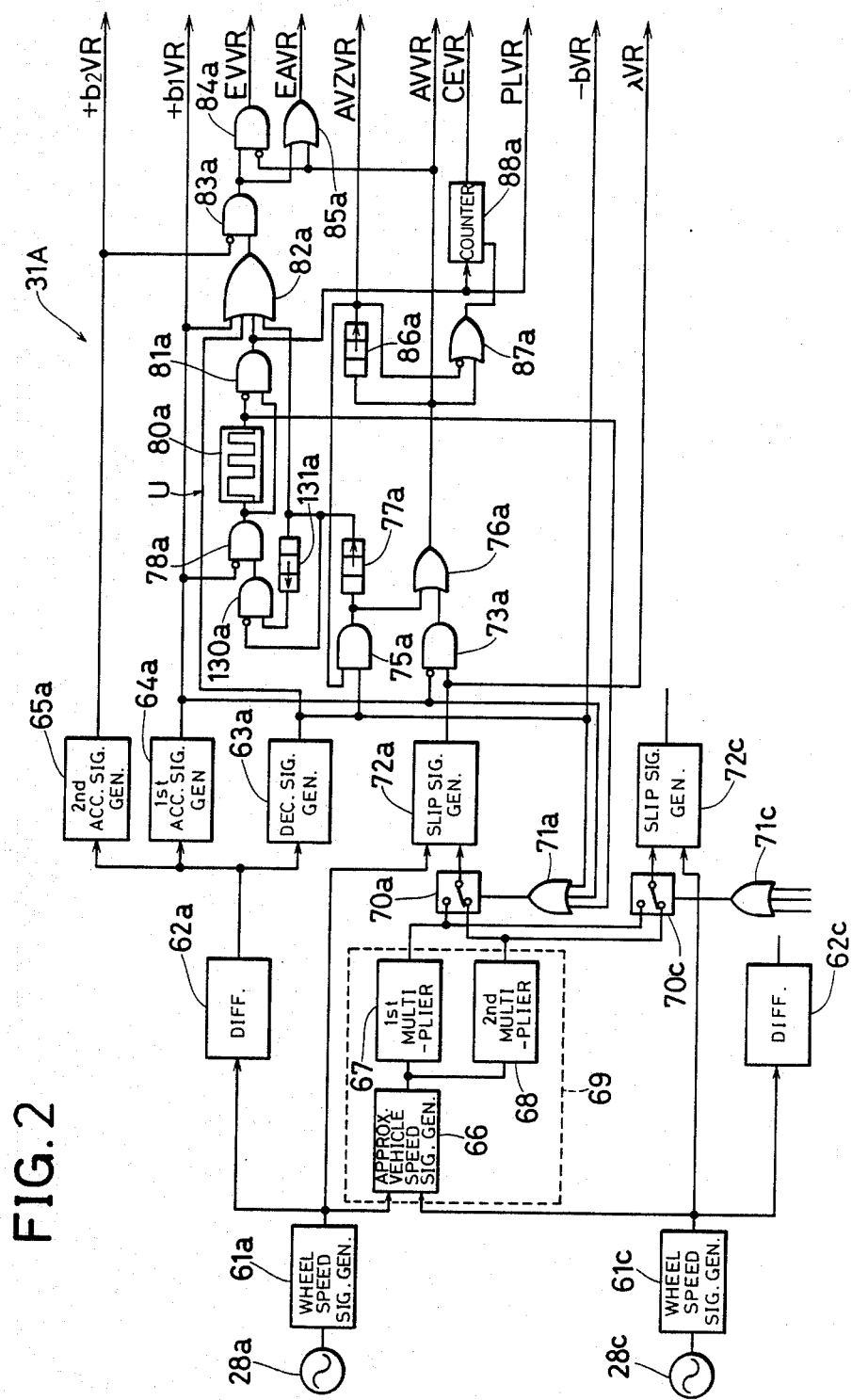
FIG. 2 is a block diagram of a judge part in FIG. 1.

Next, the details of the judge part 31A in the control unit 31 will be described with reference to FIG. 2.

The judge part 31A receives the outputs of the sensors 28a, 28b, 28c to judge the skid conditions of the wheels 6a, 6b, 11a, 11b. The rear wheels 11a and 11b are judged in common. Accordingly, they are substituted hereinafter with the rear axle 29. The judge circuits for the respective wheels 6a, 6b, and the rear axle 29 are the same in construction. FIG. 2 shows only the judge circuit for the right front wheel 6a. It will be representatively described hereinafter. However, it is partially in common with the judge circuit for the rear axle 29. Accordingly, only a part of the judge circuit for the rear axle 29 is shown in FIG. 2. The signals from the wheel speed sensors 28a and 28c are supplied to wheel speed signal generators 61a and 61c. Digital or analogue outputs proportional to the wheel speeds are obtained from the wheel speed signal generator 61a and 61c and they are supplied to differentiators 62a, 62c, slip signal generators 72a. 72c and a slip ratio setting circuit 69. The circuit 69 is in common, in the judge circuits for the front wheel and rear axle. It consists of an approximate vehicle speed signal generator 66 and multipliers 67 and 68. The higher of the outputs of the wheel speed signal generators 61a and 61c is selected, and an approximate vehicle speed signal is formed on the basis of the higher one, in the approximate vehicle speed signal generator 66. For example, multiplier number 0.85 and 0.70 are set in the multiplies 67 and 68, respectively. Output terminals of the slip ratio setting circuit 69 are connected to change-over circuits 70a and 70c. In the circuits 70a and 70c, movable contacts are normally connected to the output sides of the multiplier 68. Output terminals of the change-over circuits 70a and 70c are connected to the slip signal generators 72a, 72c. The outputs of the change-over circuits 70a and 70c, therefore, the values of (the approximate vehicle speed x the output 0.85 or 0.70 of the multiplier 67 or 68) are compared with the wheel speeds as the outputs of the wheel speed signal generators 61a and 61c, in the slip signal generators 72a and 72c. When the formers are smaller than the latters, the slip signal generators 72a and 72c generate slip signals $\lambda$. Since the judge circuits are the same for the rear axle 29 and right front wheel 6a, hereinafter only the judge circuit for the right front wheel 6a will be described.

The differentiator 62a receives the output of the wheel speed signal generator 61a and differentiate it with respect to time. The output of the differentiator 62a is supplied to a deceleration signal generator 63a, and to first and second acceleration signal generators 64a and 65a. A predetermined threshold deceleration (for example, $-1.4$ g) is set in the deceleration signal generator 63a, and it is compared with the output of the differentiator 72a. Predetermined threshold accelerations (for example, 0.5 g and 7 g) are set in the first and second acceleration signal generators 64a and 65a respectively and they are compared with the output of the differentiator 62a. When the deceleration of the wheel becomes larger than the predetermined threshold deceleration ($-1.4$ g), a deceleration signal $-b$ is generated from the deceleration signal generator 63a. When the acceleration of the wheel becomes larger than the predetermined threshold acceleration (0.5 g) or (7 g), an acceleration signal $+b_1$ or $+b_2$ is generated from the acceleration signal generator 64a or 65a.

An output terminal of the first acceleration signal generator 64a is connected to negation input terminals (indicated by circle O) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is constituted by the acceleration signal generator 64a, the pulse generator 80a, the OR gate 82a, and the AND gate 81a, and it generates pulse signals to slowly increase the brake pressure. The width of the first pulse is so designed as to be larger than that of the sequent pulses in the pulse generator 80a. Thus, insufficiency of the braking force is prevented.

The output terminal of the deceleration signal generator 63a is connected to a second input terminal of the OR gate 82a. The output terminal of the AND gate 81a is connected to the third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the ANG gate 75a. The delay time of the OFF delay timer 86a is sufficiently long. Once the output of the OFF delay timer 86a becomes "1", it is maintained during the anti-skid control operation. An output terminal of the OR gate 76a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal generator U is connected to another input terminal of the counter 88a. Pulses and the AND gate 81a are counted by the counter 88a. When the counted number reaches a predetermined number, the output of the counter 88a becomes "1". And when the output of the OR gate 87a becomes "1", the content of the counter 88a is reset.

The output terminals of the deceleration signal generator 63a, first acceleration signal generator 64a, and pulse signal generator 80a are further connected to the respective input terminals of an OR gate 71a. The change-over circuit 70a is changed over by the output of the OR gate 71a. When the output of the OR gate 71a becomes "1", the movable contact of the change-over circuit 76a is changed over to the output side of the multiplier 67.

The output terminal of the OR gate 82a is connected to one input terminal of an AND gate 83a, and the output terminal of the second acceleration signal generator 65a is connected to another negation input terminal. The output terminal of the AND gate 83a is connected to one input terminals of an AND gate 84a and OR gate 85a. The output terminal of the OR gate 76a is connected to another negation input terminal of the AND gate 84a and to another input terminal of the OR gate 85a.

The output terminal of the AND gate 75a is connected to an OFF delay inner 77a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Ten kinds of signals are taken out from this circuit. They will be denominated as shown in the right end of FIG. 2. The output signal of the second acceleration signal generator 65a is denominated as $+b_2VR$, that of the first accelerator signal generator 64a as $+b_1VR$, of the AND gate 84a as EVVR, those of the OR gates 85a and 76a as EAVR and AVVR, respectively, that of the OFF delay timer 86a as AVZVR, that of the counter 88a as CEVR, that of the deceleration signal generator 63a as $-vVR$, that of the AND gate 81a as PLVR, and that of the slip signal generator 72a as $\lambda VR$. The letter "V" means "front side", and the letter "R" means "right side".

The judge circuits for the left front wheel 6b and the rear axle 29 are constructed in the similar manner, respectively. The ten kinds of signals $+b_1VL$, $+b_1VL$, EVVL, EAVL, AVZVL, AVVL, CEVL, PLVL, $-bVL$ and $\lambda VL$ are taken out from the judge circuit for the left front wheel 61b, where the letter "H" means "rear side" and the letter "L" means "left side". Similarly, $+b_2H$, $+b_1H$, EVH, EAH, AVZH, AVH, CEH, PLH, $-bH$ and $\lambda H$ are taken out from the judge circuit for the rear axle 29. In the circuit of FIG. 2, the approximate vehicle speed $V_{REF1}$ is formed from the rotational speeds of the right front wheel 6a and rear axle 29. Similarlily, an approximate vehicle speed $V_{REF2}$ is formed from the rotational speeds of the left front wheel 6b and the rear axle 29.

Next, the low side discrimination part 31B will be described with reference to FIG. 3.

The signals EVVL and EVVR are supplied to one input terminals of AND gates 90a and 90b and farther to other negation input terminals of these gates 90b and 90a. Output terminals of the AND gates 90a, 90b are connected to one input terminals of next AND gates 91a and 91b. An output terminal of an AND gate 94 is connected to other input terminals of the AND gates 91a and 91b. The signal EVH and a signal AVZ to be described hereinafter are supplied to negation input terminals of the AND gate 94. Output terminals of the AND gates 91a, 91b are connected to one input terminals of OR gates 92a and 92b. Output terminals of the OR gates 92a and 92b are connected to a set terminal S of a flip-flop 93 and to a reset terminal R thereof.

The Q output of the flip-flop 93 as a signal $LLS_1$ means the signal that the left side of the road is low side, before the first brake relieving signal is generated. And the $\bar{Q}$ output thereof as a signal $RSL_1$ means the signal that the right side of the road is low side.

The signals EVVL and EVVR are farther supplied to first and second negation input terminals of an AND gate 95. The signal EVH is supplied to a third input terminal of the gate 95.

An output terminal of the AND gate 95 is connected to one input terminal of an AND gate 96. The signal AVZ to be described hereinafter is supplied to another negation input terminal of the AND gate 96. An output terminal of the gate 96 is connected to one input terminals of AND gates 97a and 97b. Output terminals of the AND gates 97a, 97b are connected to other input terminals of the OR gates 92a and 92b.

Output of a comparator 98 is supplied to another input terminals of the AND gate 97a and to another negation input terminal of the AND gate 97b. A signal $SVL = V_{REF2} - V_{VL}$ (the wheel speed of the left front wheel 6b) is supplied to (+) input terminal of the comparator 98 and another signal $SVR = V_{REF1} - V_{VR}$ (the rotational speed of the right front wheel 6a) is supplied to a (−) input terminal of the comparator 98. The signal SVL represents the slip amount of the left front wheel and the signal SVR represents the slip amount of the right front wheel. When the signal SVL is larger than the signal SVR (SVL > SVR), the output of the comparator 98 becomes "1" and when the SVL is smaller than SVR (SVL < SVR), the output of the comparator 98 becomes "0".

Figure 3:
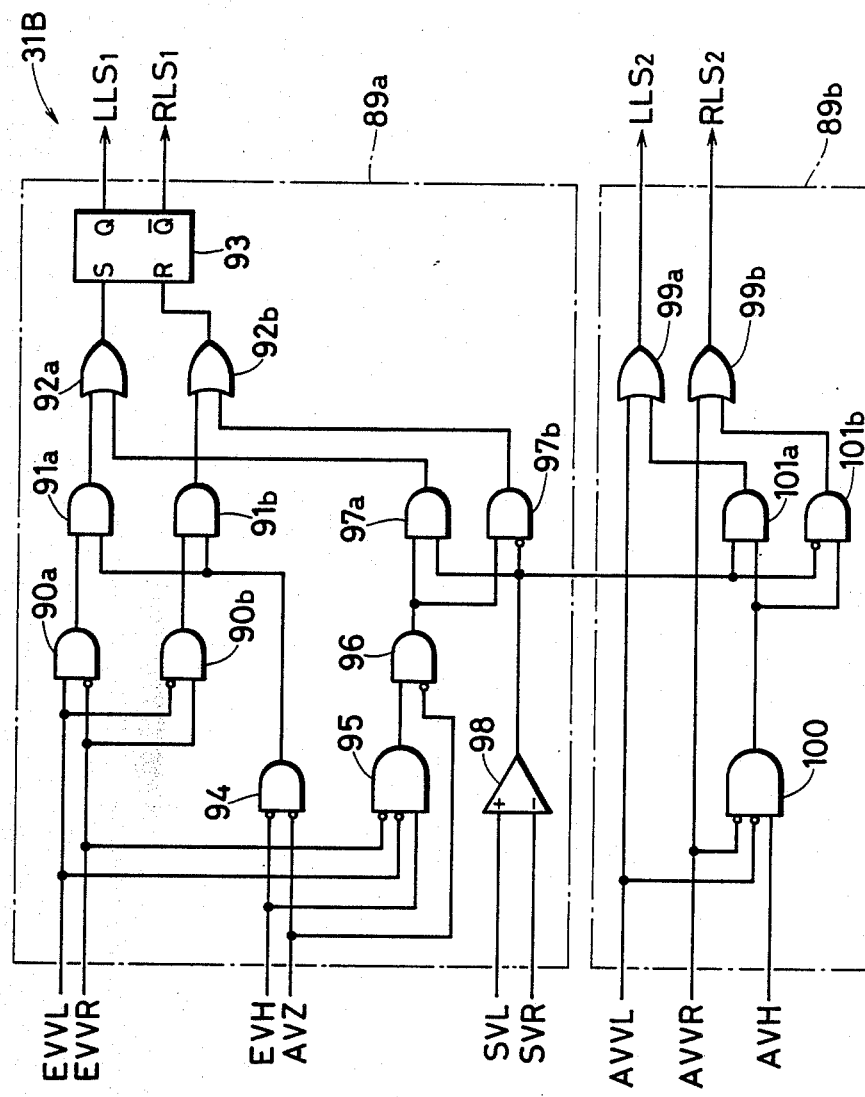
FIG. 3 is a circuit diagram of a low-side discrimination part in FIG. 1.

The low side discrimination part 31B consists of a temporary low side determining part 89a and a normal low side determining part 89b as shown by the dash lines in FIG. 3. The temporary low side determining part 89a is so constructed as above described.

The output terminal of the AND gate 90b is connected to the one input terminal of the AND gate 91b and the output terminal of the AND gate 90b is connected to the other input terminal of the AND gate 91b. However, the AND gate 90b may be omitted. In that case, a signal EVVL is negated and supplied to the one input terminal of the AND gate 91b. Thus, in the usual condition when the anti-skid control operation is not effected, the output of the AND gate 91b is "1" and the signal $RLS_1$ at the output terminal Q of the flip-flop 93 is "1". Thus, the right side of the road may be assumed to be low side. Or the circuit may be so constructed to assume that the left side of the road is usually low side.

In the normal low side determining part 89b, the signals AVVL and AVVR are supplied to one input terminals of OR gates 99a and 99b. Output terminals of AND gates 101a and 101b are connected to other input terminals of the OR gates 99a and 99b. An output terminal of an AND gate 100 is connected to one input terminals of the AND gates 101a and 101b. The output terminal of the above comparator 98 is connected to the other input terminal of the AND gate 101a and to the negation input terminal of the AND gate 101b. The signals AVVL and AVVR are supplied to first and second negation input terminals of the AND gate 100 and the signal AVH is supplied to a third input terminal of the AND gate 100. The output signals $LLS_2$ and $RLS_2$ of the OR gates 99a, 99b are signals representing normal low sides. Thus, the signal $LLS_2$ is the signal that the left side of the road is low side and the signal $RLS_2$ is the signal that the right side of the road is low side.

Next, the low side change-over circuit part 31C will be described with reference to FIG. 4.

The above signals $LLS_1$ and $LLS_2$ are supplied to an OR gate 102a and an output terminal of the OR gate 102a is connected to a set terminal S of a flip-flop 103a. The signals AVZVL and AVZVR are connected to negation input terminals of OR gates 105a and 105b. Output terminals of the OR gates 105a and 105b are connected to one input terminals of AND gates 106a, 106b. Output terminals of AND gates 104a and 104b are connected to other input terminals of the OR gates 105a, 105b. The signals AVZVL and AVZVR are supplied to first input terminals of the gates 104a and 104b. $-bVL$, $+b1VL$, $\lambda VL$ and $-bVR$, $+b_1VR$, $\lambda VR$ are supplied to second, third and forth negation input terminals of the AND gates 104a, 104b, respectively. Output terminals of OR gates 102b, 102a are connected to other input terminals of the AND gates 106a, 106b respectively. Output terminals of the AND gates 106a, 106b are connected to one input terminals of OR gates 107a, 107b. Output terminals of the OR gates 107a, 107b are connected to reset terminals R of the flip-flop 103a, 103b. The Q output terminals of the flip-flops 103b and 103a are connected to other input terminals of the OR gates 107a and 107b. The low side change over part 31C is so constructed as above described. The output signal LLS is the signal that the left side of the road is low side and the signal RLS is the signal that the right side of the road is low side.

Next, the logic part 31D of the control unit 31 will be described with reference to FIG. 5.

The logic part 31D is constructed in nearly symmetrical manner with respect to the right and left wheels.

The input signals CEVL, CEVR, AVZVL, AVZVR, EVVL, EVVR, AVVL, AVVR, EAVL, EAVR, CEH, and AVH, are supplied from the judge part 31A. And the input signals LLS and RLS are supplied from the low side change-over part 31C, respectively.

The signals CEVL and CEVR are supplied to one input terminals of OR gates 113a and 113b. The signals AVZVL and AVZVR are supplied to another negation input terminals of the OR gate 113a and 113b. Output terminals of the OR gates 113a and 113b are connected to reset terminals of flip-flops 109a and 109b. The signals EVVL and EVVR are supplied to one input terminals of AND gates 108a, 108b and OR gates 118a and 118b.

The signals AVVL and AVVR are supplied to set terminals S of the flip-flops 109a and 109b, and one input terminals of OR gates 120a and 120b. The signals EAVL and EAVR are negated and then supplied to clock terminals C of the flip-flops 109a and 109b. Output terminals Q of the flip-flops 109a and 109b are connected to other input terminals of the AND gates 108a and 108b. $\overline{Q}$ terminals of the flip-flops 109a and 109b are connected to first input terminals of AND gates 117a and 117b, and further to data terminals D of other flip-flops 110a and 110b. Similarly, $\overline{Q}$ terminals of the flip-flops 110a and 110b are connected to data terminals D of the other flip-flops 109a and 109b, and they are connected to third input terminals of the AND gates 117a and 117b. Output terminals of the OR gates 118a and 118b are connected to second input terminals of the AND gates 117a and 117b.

The signals AVH and EAH are supplied to set terminals S and negation clock terminals C of the flip-flops 110a and 110b respectively. Q output terminals of the flip-flops 110a and 110b are connected to one input terminals of AND gates 116a, 116b. Output terminals of the AND gates 116a and 116b are connected to third input terminals of OR gates 111a and 111b. Output terminals of the AND gates 108a, 108b and 117a, 117b are connected to first and second input terminals thereof, respectively.

Output terminals of the OR gates 111a, 111b and 120a, 120b are connected to one input terminals of AND gates 112a and 112b, and to other negation input terminals thereof.

The signals EVH, LLS and EVH, RLS are further supplied to input terminals of AND gates 115a and 115b. Output terminals of the AND gates 115a and 115b are connected to other input terminals of the AND gates 116a, 116b and the OR gates 118a and 118b.

The signal AVH is supplied to one input terminals of AND gates 119a and 119b, and the signals LLS and RLS are supplied other input terminals of the AND gates 119a and 119b, respectively.

The above signals CEH, and AVZH are supplied to one input terminal and another negation input terminal of an OR gate 114, respectively. An output terminal of the OR gate 114 is connected to reset terminals R of the flip-flops 110a, 110b.

In the above-described manner, the control signals are formed from the judge result of the rear wheels 11a, 11b or rear axle 29 and the judge result of the front wheel running on the frictionally low side of the road.

Output signals EV' and EV of the AND gates 112a and 112b at the last stage of the logic part 31D correspond to the control signals Sb, Sa of the current level "½", and they are supplied to the solenoid portion 30b and 30a of the change-over valves 4b and 4a in FIG. 1, respectively. Output signals AV' and AV of the OR gates 120a and 120b at last stage of the logic part 31D correspond to the control signals Sb, Sa of the current level "1", and they are supplied to the solenoid portions 30b and 30a of the change-over valves 4b and 4a in FIG. 1, respectively.

The logic part 31D further includes a motor drive circuit. It consists of OFF-delay timers 8a and 8b, an OR gate 145 and an amplifier 146 connected to an output terminal of the OR gate 145. The output signals AV and AV' are supplied to input terminals of the OFF-delay timers 8a, 8b. An output Qo of the amplifier 146 is supplied to the motor 22 is FIG. 1. The output AVZ of the OR gate has been described above.

Further, according to this embodiment, the signals from the wheel speed sensors 28a, 28b, and 28c are judged or measured every a predetermined time or time-sharingly in the control unit 31. For example, the signals are judged or measured in the order of the signals respectively from the sensors 28b-28a-28c-28b-28a-28c.

Accordingly, even when the right and left front wheel speeds or the front wheels and rear axle speeds equally change at the same time, the same signals are not generated from the left and right front wheels or the front wheel and rear axle. Thus, the signals can be processed by an electronic computer.

Next, there will be described operations of the above described anti-skid apparatus.

The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valves devices 4a, 4b and the conduits 5, 17. Further, it is supplied to the wheel cylinders 12a and 12b of the rear wheels 11a and 11b through the conduits 13 and 15 and the proportioning valves 51a and 51b. Thus, the wheels 6a, 6b, 11a and 11b are braked.

It is now assumed that the frictional coefficient of the right side is smaller (low side). The brake pedal 2 is trodden. At time t1, the right front wheel 6a reaches the predetermined deceleration, and so that signal −b is generated from the deceleration signal generator 63a of FIG. 2 in the judge circuit for the right front wheel 11a.

The signal −b is supplied to the OR gate 71a, and the movable contact of the change-over circuit 70a is changed over to the output side of the multiplier 67, by the output of the OR gate 71a. The signal −b is further supplied to the third input terminal of the OR gate 82a. The output of the OR gate 82a generates the output signal EVVR through the AND gates 83a and 84a, and further the output signal EAHR through the OR gate 85a.

The signal EVVR is supplied to the AND gates 90a, and 90b in FIG. 3. Since the signal EVVL is not yet generated, the output of the AND gate 90b becomes "1" and it is supplied to the AND gate 91b. The input to the other input terminal of the AND gate 91b or the output of the AND gate 94 is "1", since the signals EVH and AVZ are not yet generated. Accordingly, the output of the AND gate 91b is "1". The output of the OR gate 92b is "1". Accordingly, the input to the reset terminal R of the flip-flop 93 is "1" and so that Q output remains "1". The signal RLS$_1$ is "1" and the right side of the road can be considered to be low side.

Figure 4:
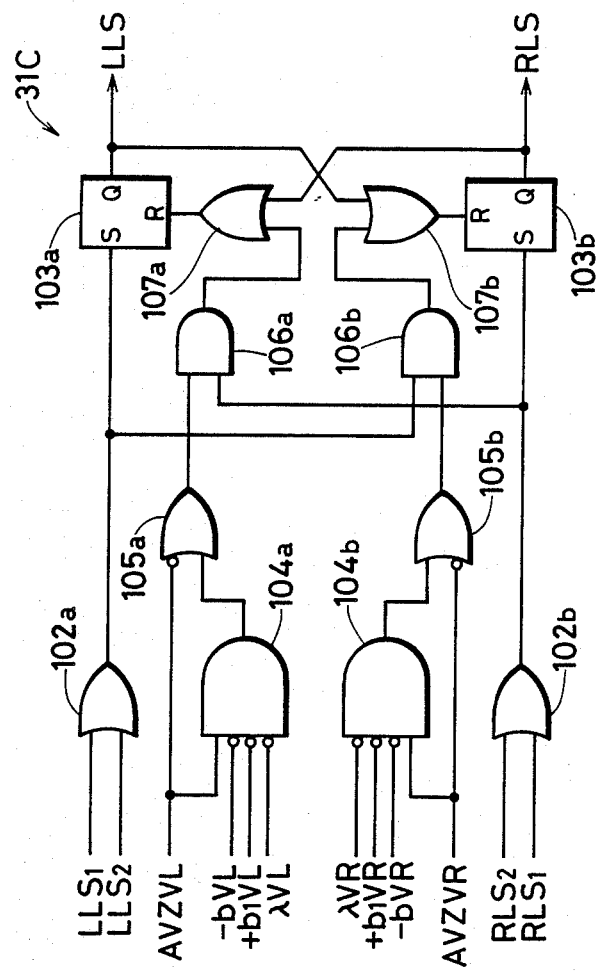
FIG. 4 is a circuit diagram of a low-side change-over part in FIG. 1.

The signal RLS$_1$ is supplied to the OR gate 102b of the low side change over part 31C in FIG. 4. The input to the set terminal S of the flip-flop 103b is "1". Accordingly, the Q output thereof becomes "1". In FIG. 5, the input "1" is supplied to the one input terminal of the AND gate 115b. However, the signal EVH is not yet generated. Accordingly, the output of the AND gate 115b is "0". However, the signal EVVR is supplied through the OR gate 118b to the AND gate 117b. The Q outputs "1" of the flip-flop 110b and 109b are supplied to the other two input terminals of the gates 117b. Accordingly, the output of the gate 117b becomes "1". Thus the output of the last stage AND gate 112b becomes "1". In FIG. 1 the change over valve 4a is changed over to the position B. Thus, the brake pressure to the right front wheel 76a and the left rear wheel 11b are maintained at constant.

Next, at time t$_1$ when the deceleration signal −b is generated from the rear axle 29, the signal EVH becomes "1". In FIG. 3, the output of the AND gate 95 remains "0", since the signal EVVR is generated. Accordingly, the $\bar{Q}$ output of the flip-flop 93 continues to be "1" and so the judgement that the right side of the read is low side, is maintained.

Figure 5:
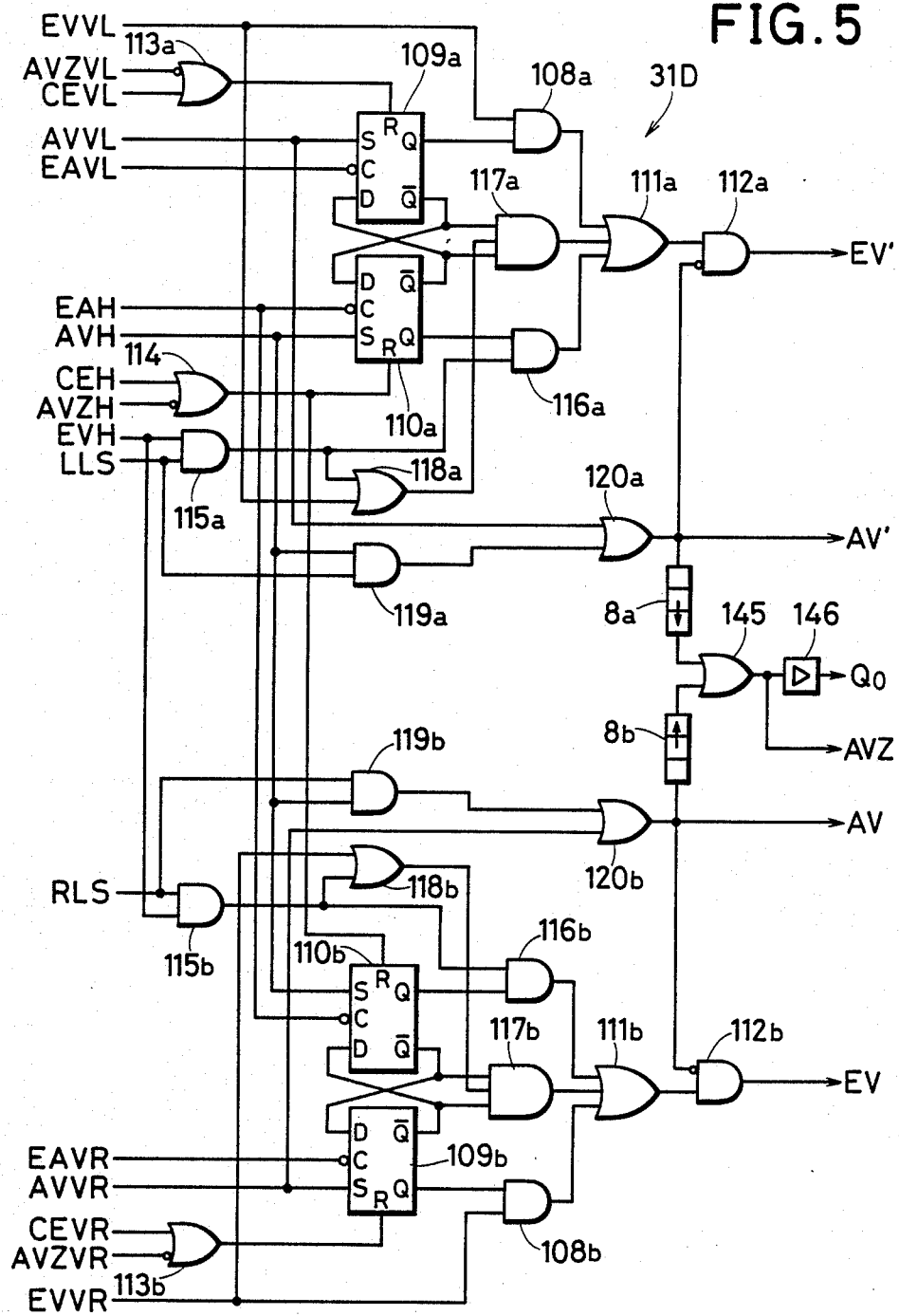
FIG. 5 is a circuit diagram of a logic part in FIG. 1.

In FIG. 5, the signal EVH is supplied to the one input terminal of the AND gate 115b and the signal RLS is supplied to the other input terminal thereof. Accordingly, the output of the AND gate 115b becomes "1". However, since the $\bar{Q}$ output of the flip-flop 110b is "0", the output of the AND gate 116b remains still "0". However, since the $\bar{Q}$ outputs of the flip-flops 110b and 109b are "1", the output of the AND gate 117b remains "1". Accordingly, even when the signal EVVR disappears, the brake pressure to the right front wheel 6a and the left rear wheel 11b are maintained at constant, so long as the signal EVH continues to be generated.

At time t$_3$, the slip rare of the right front wheel 6a becomes higher than the predetermined slip rate λ1. Accordingly in FIG. 2, the output of the slip signal generator 72a becomes "1" and so the output of the OR gate 76a becomes "1". Thus, the signal AVVR is generated. It is supplied to the OFF delay timer 86a and so the signal AVEVR becomes "1".

In FIG. 3, the signal AVVR is supplied to the OR gate 99b and so that output of the gate 99b or the signal RLS$_2$ becomes "1". It is supplied to the oR gate 102b in FIG. 4. Accordingly, the input to the set terminal S of the flip-flop 103b becomes "1". However, as above described, the flip-flop 103b is always put into the set condition with above signal EVVR. Accordingly, the Q output thereof or the signal RLS does not change, but remains "1". Thus, the judgement that the right side of the road is low side, is maintained.

In FIG. 5, the signal AVVR is supplied to the set terminal of the flip-flop 109b. Accordingly, the Q output thereof becomes "1". On the other hand, this is supplied to the OR gate 120b too. The output of the OR gate 120b becomes "1". Thus the signal AV is generated. In FIG. 1, the change over valve 4a is changed over to the position C. Accordingly, the brake pressure to the right front 6a and left rear wheel 11b are decreased.

In the motor drive circuit, the signal AVZ is generated with the output signal AV and it is supplied to the negation input terminals of the AND gates 94 and 96 in FIG. 3. Farther it is amplified by the amplifier 146 as a motor drive signal Qo. It is supplied to the motor 22. It starts to be driven.

Hereafter, when the low side of the road is changed over, the set conditions of the flip-flop 103a, 103b are changed over to each other in the low side change-over part 31C, and the judge result of the rear axle 29 and the judge result of the front wheel on the present low side are combined to control the change-over valve 4a or 4b for the front wheel on the present low side.

In the above description, the brake holding signal EVVR is first at time t1 from the right front wheel 6a. Next, there will be described the case that the brake holding signal EVH in first generated from the rear axle 29 when the brake pedal is trodden.

In FIG. 3, the signal EVH is supplied to the one input terminal of the AND gate 95. The signals EVVL and EVVR are not supplied to the other negation two input terminals thereof. Accordingly, the output of the AND gate 95 becomes "1". Farther, the signal AVZ is not yet generated. Thus, the output of the next stage AND gate 96 becomes "1" and it is supplied to the one input terminal of the AND gate 97b.

Since the right side of the read is now low side, the slip amount SVR ($=$VREF$_2$−V$_{VR}$) for the right front wheel 6a is larger than the slip amount SVL ($=$VREF$_2$−V$_{VL}$) for the left front wheel 6b. Accordingly, the output of the comparator 98 is "0". The output of the AND gate 97b becomes "1" and so the input to the reset terminal R of the flip-flop 93 becomes "1". The signal RLS$_1$ is "1". Thus, the right side of the road is judged to be temporarily low side without problem.

In FIG. 5, the input to the input terminals of the AND gate 115b are "1". Thus, the output thereof becomes "1". The output of the AND gate 117b becomes "1" similarly to the above case. The output signal EV becomes "1" and so the brake pressure to the right front wheel 6a and left rear wheel 11b is maintained at constant.

In the above description, the brake holding signal is first generated from the rear axle 29. The operation is substantially equal in the case that the brake relieving signal AVH is first generated from the rear axle 29. In that case, by the output of the comparator 98 supplied to the AND gates 101a and 101b, the low side is judged from which becomes "1" of the AND gates 101a and 101b.

According to this embodiment, the "low side" is changed over in the case that the front wheel 6b on the "high side" generates the pressure decreasing signal AVVL during the anti-skid control while the front wheel 6a on the "low side" is rotating in the stable region or condition of the "$\mu$-slip characteristics". In order to obtain such an operation, a circuit as shown in FIG. 4 is used.

As clear from FIG. 3 and FIG. 4, the signals AVVL and AVVR are supplied through the OR gates 99a, 102a and 99b, 102b to the set terminals S of the flip-flops 103a and 103b respectively. Referring to FIG. 4, they are further supplied to one input terminals of the AND gates 106a and 106b, respectively. The signals AVZVL, AVZVR are supplied to first input terminals of the AND gates 104a and 104b, the signals −bVL, −bVR to second negation input terminals thereof, the signals +b$_1$ VL, +b$_1$ VR to third negation input terminals thereof, and the signals $\lambda$VL, $\lambda$VR to fourth negation input terminals thereof. Output terminals of he AND gates 104a and 104b are connected to one input terminals of OR gates 105a and 105b. Negations of the signals AVZVL, AVZVR are supplied to other input terminals of the OR gates 105a and 105b.

The definition of "the stable region of the $\mu$-slip characteristics" is described, for example, in the "these of automobile technology society" 133 page, No. 31, 1985. The "stable region" means that the wheel is rotating at smaller slip rates than the slip rate at the maximum of $\mu$-value (frictional value) in the slip rate-frictional coefficient $\mu$ characteristics. According to this embodiment, the case that none of slip signal, first acceleration signal +b, deceleration signal −b occur, is used as sure "stable region".

When the front wheel on the low side already generates the signal AVZVR or the anti-skid control has been effected, and when the front wheel 6a on the low side is rotating in the stable region, the output of the AND gate 104b is "1".

Accordingly, the input to the one input terminal of the AND gate 106b of the output stage is "1". When the front wheel 6b on the high side generates the signal AVVL, the input to the other input terminal of the AND gate 106b becomes "1", and so the output thereof becomes "1". Accordingly, the flip-flops 103b in FIG. 4 is reset, while the other flip-flop 103a is released from the reset condition and set with the signal AVVL. The Q output of the flip-flop 103a becomes "1". Thus, the "low side" is changed over.

Further according to this embodiment, the side of the one front wheel which is a larger slip amount than the other front wheel, is made "low side" in the case that the brake relieving signal AVH is generated from the rear axle 29, while the front wheels both are rotating in the stable region of the $\mu$-slip characteristics during the anti-skid control.

Thus, both of the outputs of the OR gates 105a and 105b are "1" in FIG. 4. In FIG. 3, when the signal AVH is generated, the output of the AND gate 100 becomes "1", since none of the signals AVVL and AVVR are generated. Either of the outputs of the AND gates 101a and 101b becomes "1" in accordance with the output of the comparator 98. If the left side is low side, SVL is larger than SVR (SVL>SVR). Accordingly, the output of the AND gate 101a becomes "1", and it is supplied through the OR gates 99a and 102a to the set terminal S of the flip-flop 103a, and further to the other input terminal of the AND gate 106b. The one flip-flop 103a is put into the set condition, while the other flip-flop 103b is put into the reset condition. Thus, the signal LLS becomes "1", and the left side is now judged to be low side.

In the above-described manner, when the one front wheel on the low side is rotating in the stable region of the $\mu$-slip characteristics, the side of the one front wheel which generates the brake maintaining signal sooner than the other front wheel, is newly made "low side", before anyone of said front wheels and rear axle generates said brake relieving signal.

Or when the rear axle generates the brake maintaining signal sooner than the front wheels, the side of the one front wheel which has a larger slip amount than the other front wheel, is made "low side".

When the one front wheel on the low side is rotating in the stable region of the $\mu$-slip characteristics, the side of the one front wheel which generates the brake relieving signal sooner than the other front wheel, is made to be low side.

There has been described the first embodiment of the first invention. The first embodiment of the second invention is applied to a front drive car, although not shown. A differential gear mechanism (front diff.) is provided on a front axle which combines the front wheels. A common wheel speed sensor for front wheels is provided in the front diff., and wheel speed sensors are associated with the respective rear wheels. In the above description, "VL" "VR" and "H" are submitted with "HL" "HR" and "V", respectively. Further, "the rear axle" is substituted with "the front axle". Thus, the same description holds good.

In the above embodiments, when the brake to the front or rear wheel on the low side is relieved, also the brake to the rear or front wheel diagonally connected to the front or rear wheel on the low side is relieved. Thus, the brake to the rear or front wheel on the high side is relieved. On the other hand, the brake to the rear or front wheel on the low side continues to rise.

Accordingly, there is the fear that the rear or front wheel on the low side locks. However, both of the front wheels and both of the rear wheels are not locked and so the running stability can be secured.

However, when a lock mechanism is provided in the differential gear 34, or front diff., it can be avoided that the rear or front wheel on the low side locks.

For example, when the brake pressure to the right rear or front wheel decreases, the brake pressure to the left rear or front wheel belonging to the same conduit as the above right front or rear wheel decreases. Accordingly, the wheel speed of the left rear or front wheel increases.

On the other hand, the brake pressure of the right rear or front wheel rises with the left front or rear wheel 6b of the same conduit system. The right rear or front wheel tends to lock. However, when the rotational torque difference becomes larger than a predetermined value between the rear or front wheels, some rotational torque is transmitted through the lock mechanism from the left rear or front wheel having larger rotational torque to the right rear or front wheel. Accordingly, the wheel speed of the right rear or front wheel rises.

Thus it can be prevented that the right rear or front wheel on the low side locks. The brake holding and relieving operations of the other conduit system can be effected in the same manner.

Next, an anti-skid control apparatus according to a second embodiment of this invention will be described with reference to FIG. 6 and FIG. 7. Parts in FIG. 6 which correspond to those in FIG. 1 are denoted by the same reference numerals, the description of which will be omitted.

In this embodiment, a valve apparatus 120 is arranged between the wheel cylinders 7a, 7b of the front wheels 6a, 6b and those 12a, 12b of the rear which 11a, 11b.

Figure 6:
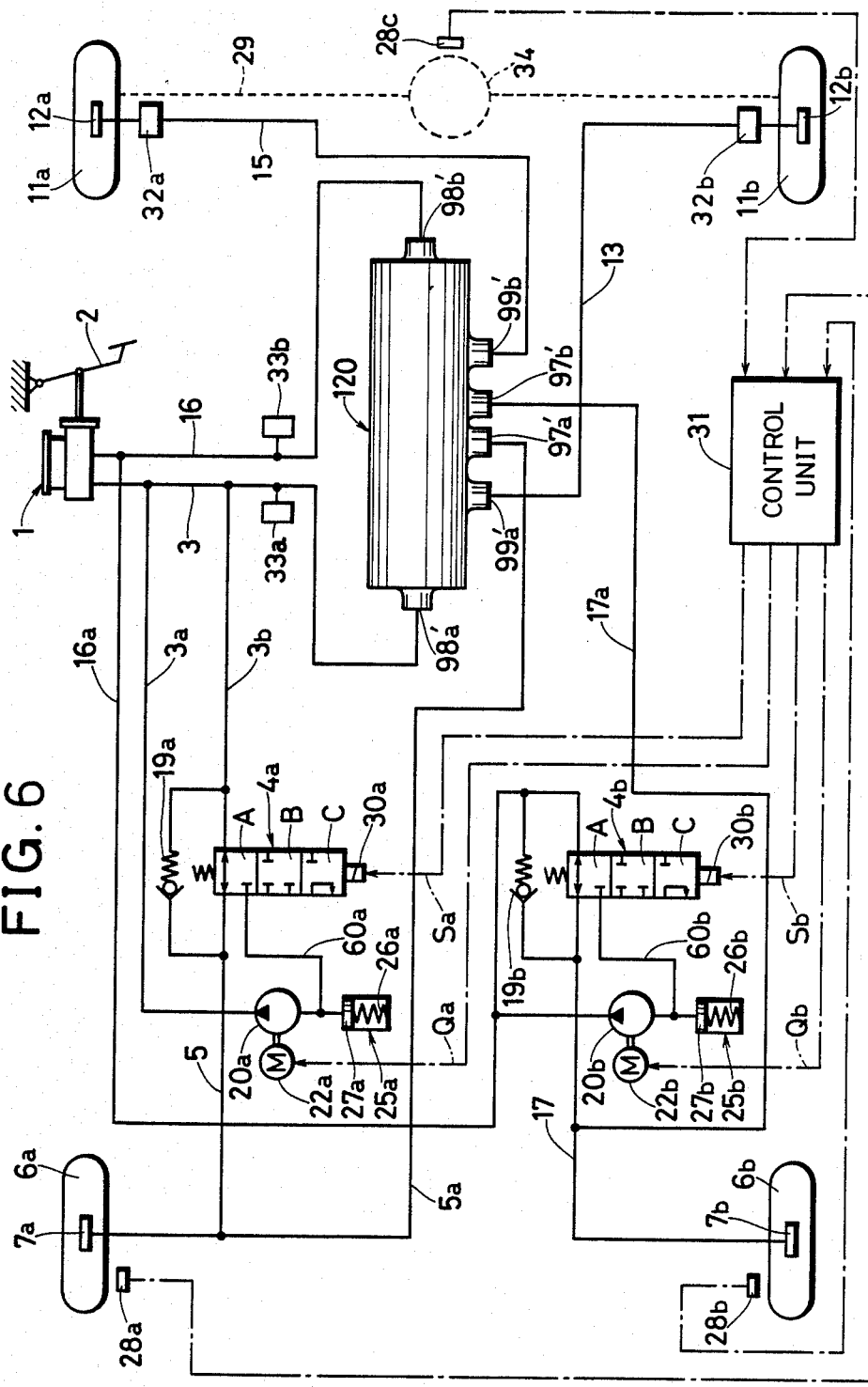
FIG. 6 is a schematic view of anti-skid control apparatus according to a second embodiment of this invention.

Further, the pump 20a, 20b and motors 22a, 22b are separately shown in FIG. 6 respectively. However, they are equal to those shown in FIG. 1 in which they are single.

Next, the details of the value apparatus 120 will be described with reference to FIG. 7.

Figure 7:
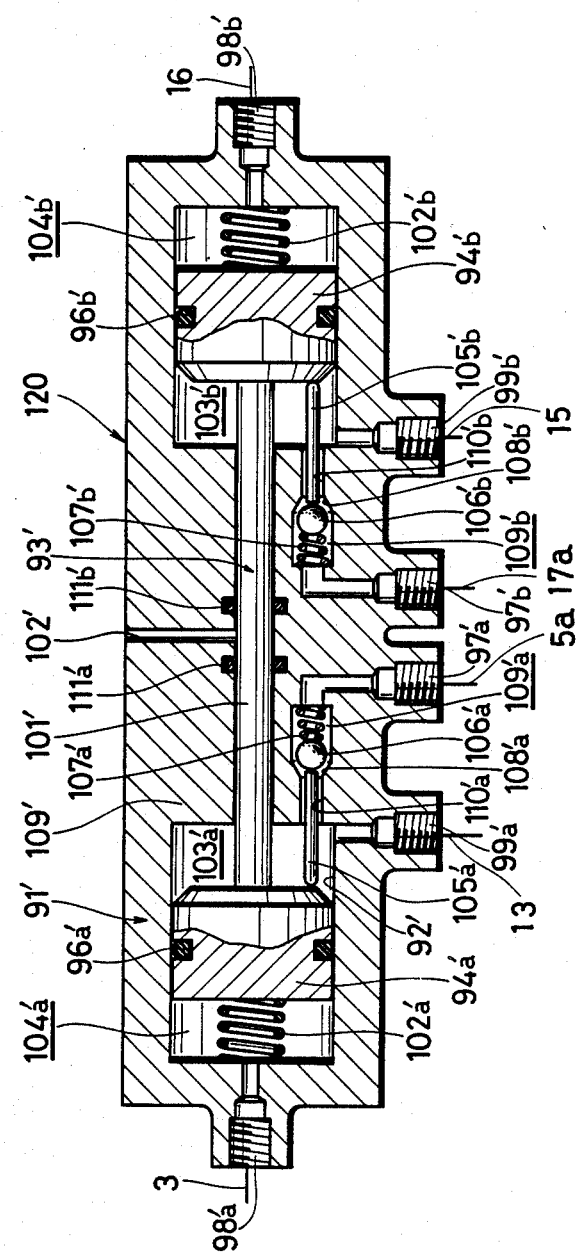
FIG. 7 is an enlarged cross-sectional view of a valve apparatus in FIG. 6.

In FIG. 7, an axial through hole 92' is made in a casing 91' for a valve apparatus 120. A piston group 93' consisting of three members is slidably fitted to the stepped hole 92'. The three members are a pair of larger-diameter pistons 94a' and 94b' and a smaller-diameter piston 101'. The larger-diameter pistons 94a' and 94b'' are provided with seal rings 96a' and 96b'. Output chambers 103a' and 103b' are formed at the insides of the larger-diameter pistons 94a' and 94b'. Master cylinder pressure chambers 104a' and 104b' are formed at the outsides of the larger-diameter pistons 94a' and 94b'. The smaller-diameter piston 101' is slidably fitted to a central hole of a partition 109' of the casing 91', sealed with seal rings 111a' and 111b'. A space between the seal rings 111a' and 111b' communicates through a vent 102' with the atmosphere. The larger-diameter pistons 94a' and 94b' are urged inwards by springs 102a' and 102b' which are equal to each other in spring force. Thus, the piston groups 93' is normally located at a shown neutral position.

The master cylinder pressure chambers 104a' and 104b', and the output chambers 103a' and 103b' communicate with the conduits 3 and 16, an 13 and 15 through connecting ports 98a' and 98b', and output ports 99a', respectively.

Valve rods 105a' and 105b' are slidably fitted to axial holes 110a' and 110b' made in the partition 109' of the casing 91'. Outer ends of the valve rods 105a' and 105b' contract with the inner surfaces of the larger-diameter pistons 94a' and 94b'. Inner end thereof contact with valve balls 106a' and 106b' urged by springs 107a' and 107b'. When the piston group 93' is located at the shown neutral position, the valve balls 106a' and 106b' are separated from valve seats 108a' and 108b', as shown in FIG. 7. Valve chambers 019a' and 109b'' in which the springs 107a' and 107b' are compressed, communicate with the conduits 5a and 17a through input ports 97a' and 97b', respectively.

Next, there will be described operations of the above-described apparatus of the second embodiment.

First, it is assumed that both of the two conduit systems are in order, and the right front and rear wheels 6a and 11a are running on the frictionally lower side of the road, as in the first embodiment.

When the valve 4a is changed over into the position C with the start of the skid control operation, the pressurized fluid is discharged from the wheel cylinder 8a of the right front wheel 6a into the reservoir 25a through the conduit 60a, while it is discharged from the wheel cylinder 12b of the left rear wheel 11b into the reservoir 25a through the conduit 13, the output port 99a' of the valve apparatus 120, the space between the valve ball 106a' and the valve seat 108a' therein, the input port 97a' thereof, and the conduits 5a and 60a. Thus, the brakes of the wheel 6a and 11b are relieved.

In the valve apparatus 120, the fluid pressure decreases in the one output chamber 103a' while it still increases in the other output chamber 103b'. Accordingly, the whole of the piston group 93' is moved rightwards. The right valve rod 105b' is moved rightwards together, and the valve ball 106b' comes to contact with the valve seat 108b'.

Thus, the valve ball 106b'' closes. ON the other hand, the left valve rod 105a'' is moved rightwards, and the valve ball 206a' is further separated from the valve seat 108a'. Thus, the valve ball 106a' is maintained at the open state.

The volume of the one output chamber 103b' increases with the rightward movement of the piston group 93'. Now the one output chamber 103b is interrupted from the wheel cylinder 7b of the left front wheel 6b. Accordingly, the fluid pressure of the wheel cylinder 12a of the right rear wheel 11a communicating always with the one output chamber 103b' decreases with the increase of the volume of the chamber 103b'. The other operations of both of the two conduit systems are in order and are the same as in the first embodiment.

The control unit 31 is equal to that of the first embodiment. The output signals Sa, Sb change in the same manner as those of the first embodiment. The piston groups 93' are moved rightwards or leftwards in accordance with the levels of the signals Sa, Sb. The brake pressure of the rear wheels 11a, 11b changes in accordance with the lower one of the brake pressures of the front wheels 6a, 6b. When the valve apparatus 120 is used, it can be avoided that both of the rear wheels lock.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly in the valve apparatus 120, the fluid pressure of the one master cylinder pressure chamber 104b' rises, while that of the other master cylinder pressure chamber 104a' remains zero.

Thus, the fluid pressures to both sides of the one larger-diameter piston (94a') of the piston group 93' are zero. Those to both sides of the other larger-diameter portion 94b of the piston group 93' are not zero, and substantially equal to each other. As the result, the piston group 93' is not moved, and remains located at the shown neutral position. Accordingly, the valve ball 106b' remains separated from the valve seat 108b'.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 1 into the wheel cylinder 12a of the right rear wheel 11a through the conduit 17a, the input chamber 109b' of the valve apparatus 120, the output chamber 103b' thereof (the valve ball 106b' opened), and the conduit 15. Thus, the braking force can be securely obtained in the one conduit system.

When the valve 4b is changed over into the position B or C with the tendency of the locking of the front or rear wheel 6b or 11a, the fluid pressure of the input and output chambers 109b' and 103b' becomes lower than that of the master cylinder pressure chamber 104b' in the valve apparatus 120, and so the piston group 93' is moved rightwards with the fluid pressured difference between both sides of the larger diameter position 94b'. Accordingly, the valve ball 106b' is moved further rightwards and separated far from the valve seat 108b'. The valve ball 106b' remains separated.

Whether the valve 4b is changed over into the position B, the wheel cylinders 7b and 12a of the wheels 6b and 11a are interrupted both for the master cylinder and from the reservoir 25b, so that the fluid pressure of the wheel cylinders 7b and 12a increases with the rightward movement of the piston group 93', since the volume of the output chambers 103b' decreases therewith.

When the valve 4b is changed over not the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

Next, a third embodiment of this invention, which corresponds to the second embodiment of the second invention, will be described with reference to FIG. 8.

Figure 8:
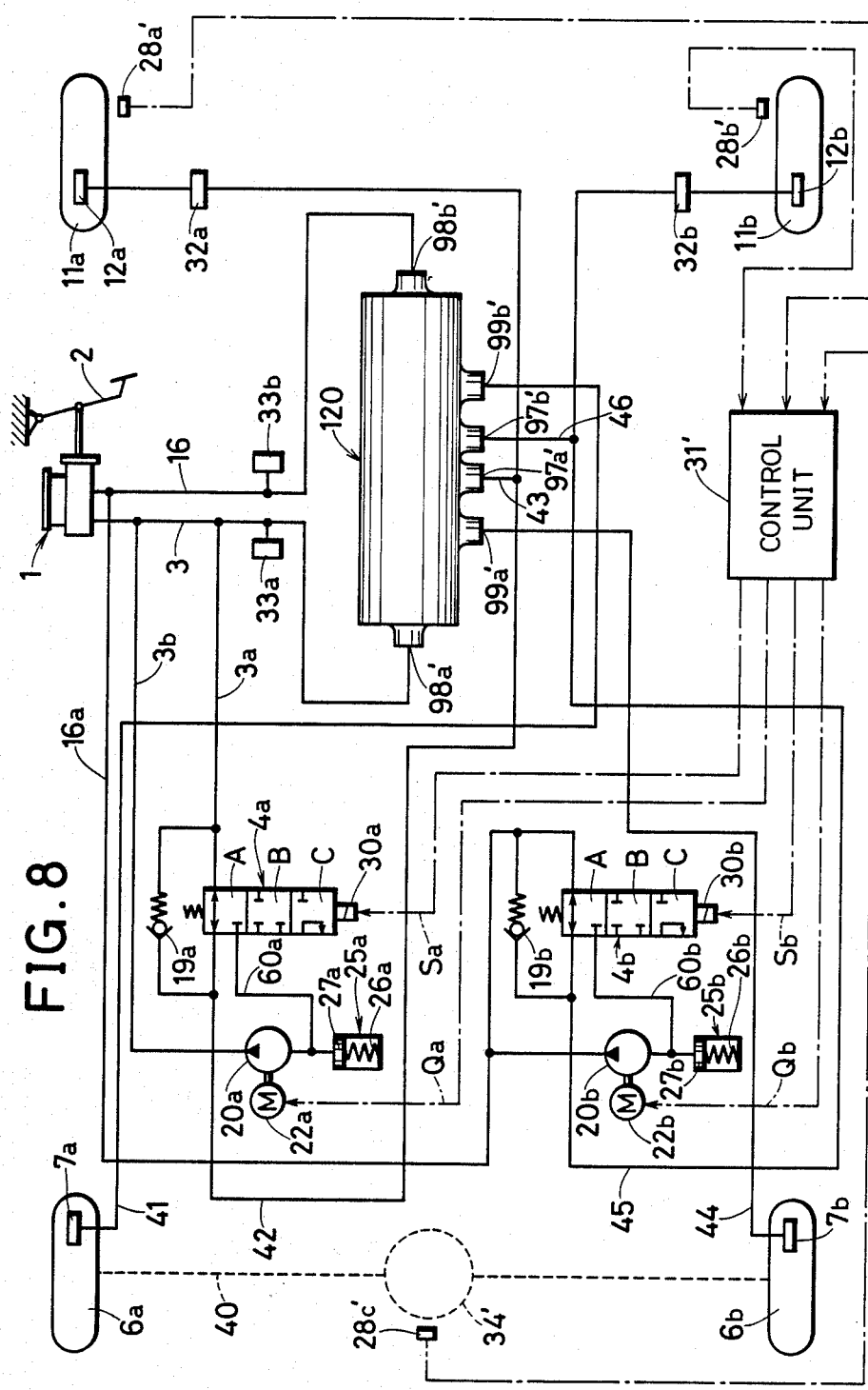
FIG. 8 is a schematic view of an anti-skid control apparatus according to a third embodiment of this invention.

Parts in FIG. 8 which correspond to those in FIG. 1 and FIG. 6, are denoted by the same reference numerals, the description of which will be omitted.

A common wheel speed sensor 28c' for the front wheels 6a and 6b is provided on a front differential gear mechanism 34' which is arranged on a front axle 40 for combining the front wheels 6a and 6b. Wheel speed sensors 28a' and 28b' are associated with the respective rear wheels 11a and 11b. The valve apparatus 120 is arranged between the rear wheels and the front wheels. However, the connection relationship among the change-over valves 4a, 4b, the wheel cylinders of the wheels 6a, 6b, 11a and 11b and the valve apparatus 120 in FIG. 8, is different from that in FIG. 6.

The valve apparatus 120 is equal to that in FIG. 7. the output port of the change-over valve 4a is connected through a conduit 42 to the wheel cylinder 12a of the right rear wheel 11a, and a conduct 43 divided from the conduit 42 is connected to the connection port 97a' of the valve apparatus 120. The connection port 99a' which normally communicates with the connection port 97a', is connected through a conduit 44 to the wheel cylinder 7b of the left front wheel 6b.

The output port of the change-over valve 4b is connected through a conduit 45 to the wheel cylinder 12b off the right rear wheel 11b, and a conduit 46 divided from the conduit 45 is connected to the connection port 97b' of the valve apparatus 120. The connection port 99b' which normally communicates with the connection port 97b', is connected through a conduit 47 to the wheel cylinder 7a of the left front wheel 6a.

A control unit 31' is similar to that of the first embodiment which are shown in FIG. 2 to FIG. 5. In the symbols representing the respective input and output signals in FIG. 2 to FIG. 5, "VL", "VR" "H" are substituted with "HL", "HR", "V", respectively. Further, the "rear axle 29" is substituted with "the front axle 40" in the above description of the first embodiment. Still further, with respect to the operation of the embodiment of FIG. 8, "the front wheel 6a''" and "the front wheel 6b''" are substituted with the rear wheel 11a'' and "rear wheel 11b'',"respectively in the above description of the operation of the embodiment of FIG. 6 and FIG. 7.

While the preferred embodiments have been described, variations thereto will occur to those skilled in the art within the scope of the present inventive concepts which are delineated by the following claims.

For example, in the first embodiment of the first invention, before anyone of the front wheels both and rear axle first generates the brake relieving signal, the side of the one front wheel which generates the brake maintaining signal sooner than the other front wheel, is made "low side". Or when the rear axle generates the brake maintaining signal sooner than the front wheels, the side of the one front wheel which has a larger slip amount than the other front wheel, is made "low side".

Instead, the side of the one front wheel whose wheel speed is lower than the other front wheels speed, may be low side. Or the side of the one front wheel whose deceleration is larger than the other front wheel's deceleration, may be "low side".

Further, in the first embodiment, the side of the one front wheel which generates the brake relieving signal sooner than the other front wheel, is newly made "low side".

Or when the rear axle generates the brake relieving signal sooner than the front wheels, the side of the one front wheel which has a larger slip amount than the other front wheel, is made "low side". Instead, the side of the one front wheel whose wheel speed is lower than the other front wheel's speed, may be low side. Or the side of the one front wheel whose deceleration is larger than the other front wheel's deceleration, may be "low side".

In the above embodiments, the slip amount may be slip ratio or slip value.

Further in the first embodiment, the signals AVZVL, AVZVR, $-bVL$, $-bVR$, $+b_1VL$, $+b_1VR$ and $\lambda VL$, $\lambda VR$ are supplied to the first, second, third and fourth input terminals of the AND gates 104a, 104b, respectively in FIG. 4, in order to detect the stable region during the anti-skid control. Instead, only the step-wise brake increasing signals PLVL, PLVR may be used. In that case, th signals PLVL, PLVR are directly supplied to the OR gates 105a, 105b, respectively.

Further in the above embodiment, the higher of the rotational speeds of the right front wheel 6a and rear axle 29 is used for forming the approximate vehicle speed, for detecting the slip amount or rate of the right front wheel 6a. And the higher of the rotational speeds of the left front wheel 6b and rear axle 29 is used for forming the approximate vehicle speed, for detecting the slip amount or rate of the left front wheel 6b. Instead, the highest of the three wheel speed sensors may be used for forming the approximate vehicle speed in common.

Or the low side may be determined only from the skid signals of the front wheels both or rear wheels both irrespective of the skid signal of the rear axle or front axle.

In the motor drive circuit shown in FIG. 5, the signals AV, AV' are supplied through the OFF delay timers 8a, 8b to the OR gate 145. Instead, the signals AVZVR AVZHL, AVZVL and AVZHR may be connected directly to the OR gate 145.

In the above embodiments, the rear or front drive car has been described. Instead, a four-wheel drive (4 WD) car may be applied to this invention.

Further, in the above embodiments, the braking force is also maintained at constant during the anti-skid control operations. However, the brake holding operation is not always needed.

The other modifications are as follows:

(1) The "low-side" is changed over in the case that the other front wheel on the high side generates the brake relieving signal during the time when the one front wheel on the low side and the rear axle are rotating in the stable region of the $\mu$ (fricitonal coefficient)—slip characteristics.

The "rear axle" may be substituted with the rear wheels. That holds true hereinafter.

(2) The "low side" is changed over in the case that the other front wheel on the high side and the rear axle generate the brake relieving signal during the time when the one front wheel on the low side is rotating in the stable region of the $\mu$ (frictional coefficient)—slip characteristics.

(3) The "low side" is changed over in the case that the other front wheel on the high side generates continuously the brake relieving signal for a longer time than a predetermined time during the time when the one front wheel on the low side is rotating in the stable region of the $\mu$ (frictional coefficient)—slip characteristics.

(4) The "low side" is changed over in the case that the other rear wheel on the high side generates continuously the brake relieving signal for a longer time than a predetermined time during the time when the one front wheel on the low side and the rear axle are rotating in the stable region of the $\mu$ (frictional coefficient)—slip characteristics.

(5) The "low side" is changed over in the case that the other front wheel on the high side and the rear axle generate continuously the brake relieving signal for a longer time than a predetermined time during the time when the one front wheel on the low side is rotating in the stable region of the $\mu$ (frictional coefficient)—slip characteristics.

(6) The "low side" is changed over in the case that the one front wheel on the low side is rapidly accelerated beyond a predetermined acceleration threshold during the time when the other front wheel on the high side generates the brake relieving signal.

(7) The "low side" is changed over in the case that the one front wheel of the low side is rapidly accelerated beyond a predetermined acceleration threshold during the time when the other front wheel on the high side and the rear axle generates the brake relieving signal.

(8) The "low side" is changed over in the case that said one front wheel on the low side and the rear axle are rapidly accelerated beyond a predetermined acceleration threshold during the time when the other front wheel on the high side generates the brake relieving signal.

(9) The "low side" is changed over in the case that the other front wheel on the high side generates continuously the brake relieving signal for a longer time than a predetermined time during the time when the brake relieving signal of the one front wheel on the low side disappears.

(10) The "low side" is changed over in the case that the other front wheel on the high side generates continuously the brake relieving signal for a longer time than a predetermined time during the time when the brake relieving signals of the one front wheel on the low side and of the rear axle disappears.

(11) The "low side" is changed over in the case that the other front wheel on the high side and the rear axle generate continuously the brake relieving signal for a longer time than a predetermined time during the time when the brake relieving signal of the one front wheel on the low side disappears.

(12) The predetermined time described in the above items (3) to (5) and (9) to (11) is changed in accordance with the continuation time of the brake relieving signal of the one front wheel on the low side in the last control cycle.

(13) When the one front wheel on the low side has rotated continuously in the stable region of the $\mu$-slip characteristics for a longer time than a predetermined time, when the number of the steps of the brake stepwisely increasing signal for the one front wheel on the low side has reached a predetermine value, or when the one front wheel on the low side generates continuously the brake increasing signal for a longer time than a predetermined time, the side of the one front wheel which generates the brake maintaining signal sooner than the other front wheel, is newly made "low side", before anyone of the front wheels and rear axle generates the brake relieving signal, or when the rear axle generates the brake maintaining signal sooner than the front wheels both, the side of the one front wheel which has a larger slip amount than the other front wheel, is made "low side".

(14) When the one front wheel on the low side and the rear axle have rotated continuously in the stable region of the $\mu$-slip characteristics for a longer time than a predetermined time, when the number of the steps of the brake site-wisely increasing signal for the one front wheel on the low side has reached a predetermined value, or when the one front wheel on the low side generates continuously the brake increasing signal for a longer time than a predetermined time, the side of the one front wheel which generates the brake maintaining signal sooner than the other front wheel, is newly made "low side", before anyone of the front wheels and rear axle generate the brake relieving signal, or when the rear axle generates the brake maintaining signal sooner than the front wheels both, the side of the one front wheel which has a larger slip amount than the other front wheel, is made "low side".

(15) When the one front wheel on the low side has rotated continuously in the stable region of the μ-slip characteristics for a longer time than a predetermined time, when the number of the steps of the brake step-wisely increasing signal for the one front wheel on the low side has reached a predetermined value, or when the one front wheel on the low side generates continuously the brake increasing signal for a longer time than a predetermined time, the side of the one front wheel which generates the brake relieving signal sooner than the other front wheel, is newly made "low side", or when the rear axle generates the brake relieving signal sooner than the front wheels both, the side of the one front wheel which has a larger slip amount than the other front wheel, is made "low side".

(16) When the one front wheel on the low side and the rear axle have rotated continuously in the stable region of the μ-slip characteristics for a longer time than a predetermined time, when the number of the steps of the brake step-wisely increasing signal for the one front wheel on the low side has reached a predetermined value, or when the one front wheel on the low side generates continuously the brake increasing signal for a longer time than a predetermined time, the side of the one front wheel which generates the brake relieving signal sooner than the other front wheel, is newly made "low side", or when the rear axle generates the brake relieving signal sooner than the front wheels both, the side of the one front wheel which has a larger slip amount than the other front wheel, is made "low side".

The above modifications (1) to (16) relate to the first invention of the inventions in which the wheel speed sensors 28a, 28b are associated with the front wheels, respectively, and the one common speed sensor 28c is associated with the rear wheels. The "front" and "rear" may be substituted with the "rear" and "front", respectively, in the modifications of the second invention of the inventions in which the wheel speed sensors 28a', 28b' are associated with the rear wheels, respectively, and the one common speed sensor 28c' is associated with the front wheels.

What is claimed is:

1. An anti-skid control apparatus for a vehicle braking system comprising:
   (A) a pair front wheels, and a pair of rear wheels;
   (B) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (C) a second fluid pressure control valve device for controlling the brake fluid pressure of the wheel cylinder of another of said front wheels, arranged between a second fluid pressure generating chamber of said tandem master cylinder and said wheel cylinder of the other front wheel;
   (D) a first path which transmits the brake fluid pressure controlled by said first fluid pressure control valve device, to the wheel cylinder of the one of said rear wheels connected diagonally to said one front wheel;
   (E) a second path which transmits the brake fluid pressure controlled by said second fluid pressure control valve device, to the wheel cylinder of the other of said rear wheels connected diagonally to said other front wheel;
   (F) first and second wheel speed sensors associated with said front wheels, respectively;
   (G) a third wheel speed sensor associated in common with said rear wheels, and
   (H) a control unit receiving outputs of said first, second and third wheel speed sensors for measuring or judging the skid conditions of said front and rear wheels and for generating instructions for controlling said first and second fluid pressure control valve devices; wherein said control unit discriminates the frictionally lower one (designated as "low side") of the sides of the road on which said wheels are running, from the measuring or judging results of the skid conditions of said rear and front wheels, or of said front wheels on the basis of the outputs of said first, second and third wheel speed sensors, or of said first and second wheel speed sensors, said low side being able to change over in accordance with said measuring or judging results at any time, combines logically the measuring or judging results of the skid conditions of said rear wheels with the measuring or judging result of the skid condition of the one front wheel running on the low side for generating the instruction for controlling said first or second fluid pressure control valve device, and generates the instruction for controlling said second or first fluid pressure control valve device, on the basis of the measuring or judging result of the skid condition of the other front wheel running on the high side (frictionally higher side) independently of those of said rear wheels.

2. An anti-skid control apparatus according to claim 1, in which said measuring or judging results of the skid conditions include a brake increasing signal, a brake maintaining or holding signal and a brake relieving signal, and the side of the one front wheel which generates said brake maintaining signal sooner than the other front wheel, is made "low side", before anyone of said front and rear wheels generates said brake relieving signal, or when the rear wheels generate said brake maintaining signal sooner than said front wheels both, the side of the one front wheel whose slip is more than the other front wheel's slip, is made "low side".

3. An anti-skid control apparatus according to claim 1, in which said measuring or judging results of the skid conditions include a brake increasing signal, a brake maintaining or holding signal and a brake relieving signal, and the side of the one front wheel which generates said brake relieving signal sooner than the other front wheel, is made "low side", or when the rear wheels generate said brake relieving signal sooner than said front wheels both, the side of the one front wheel whose slip is more than the other front wheel's slip, is made "low side".

4. An anti-skid control apparatus according to claim 1, in which said measuring or judging results of the skid conditions include a brake increasing signal, a brake maintaining or holding signal and a brake relieving signal, and the side of the one front wheel which generates said brake maintaining signal sooner than the other front wheel, is made "low side", before anyone of said front and rear wheels generates said brake relieving signal, or when the rear wheels generate said brake maintaining signal sooner than said front wheels both, the side of the one front wheel whose speed is lower than the other front wheel's speed, is made "low side".

5. An anti-skid control apparatus according to claim 1, in which said measuring or judging results of the skid conditions include a brake increasing signal, a brake maintaining or holding signal and a brake relieving signal, and the side of the one front wheel which generates said brake relieving signal sooner than the other front wheel, is made "low side", or when the rear wheels generate said brake relieving signal sooner than said front wheels both, the side of the one front wheel whose speed is lower than the other front wheel's speed, is made "low side".

6. An anti-skid control apparatus according to claim 1, in which said measuring or judging results of the skid conditions include a brake increasing signal, a brake maintaining or holding signal and a brake relieving signal, and the side of the one front wheel which generates said brake maintaining signal sooner than the other front wheel, is made "low side", before anyone of said front and rear wheels generates said brake relieving signal, or when the rear wheels generate said brake maintaining signal sooner than said front wheels both, the side of the one front wheel whose deceleration is lower than the other front wheel's deceleration, is made "low side".

7. An anti-skid control apparatus according to claim 1, in which said measuring or judging results of the skid conditions include a brake increasing signal, a brake maintaining or holding signal and a brake relieving signal, and the side of the one front wheel which generates said brake relieving signal sooner than the other front wheel, is made "low side", or when the rear wheels generate said brake relieving signal sooner than said front wheels both, the side of the one front wheel whose deceleration is more than the other front wheel's deceleration, is made "low side".

8. An anti-skid control apparatus according to claim 1, in which a valve apparatus for generating a fluid pressure in accordance with the lower one of the brake fluid pressures of said front wheels controlled with said first and second fluid pressure control valve devices, is arranged between said first and second paths.

9. An anti-skid control apparatus for a vehicle braking system comprising:

(A) a pair front wheels, and a pair of rear wheels;
(B) a first fluid pressure control valve device for controlling the brake fluid pressure of the wheel cylinder of one of said rear wheels, arranged between a first fluid pressure generating chamber of a tandem master cylinder and said wheel cylinder of the one rear wheel;
(C) a second fluid pressure control valve device for controlling the brake fluid pressure of the wheel cylinder of another of said rear wheels, arranged between a second fluid pressure generating chamber of said tandem master cylinder and said wheel cylinder of the other rear wheel; and
(D) a first path which transmits the brake fluid pressure controlled by said first fluid pressure control valve device, to the wheel cylinder of the one of said front wheels connected diagonally to said one rear wheel;
(E) a second path which transmits the brake fluid pressure controlled by said second fluid pressure control valve device, to the wheel cylinder of the other of said front wheels connected diagonally to said other rear wheel;
(F) first and second wheel speed sensors associated with said rear wheels, respectively,
(G) a third wheel speed sensor associated in common with said front wheels, and
(H) a control unit receiving outputs of said first, second and third wheel speed sensors for measuring or judging the skid conditions of said front and rear wheels and for generating instructions for controlling said first and second fluid pressure control valve devices; wherein said control unit discriminates the frictionally lower one (designated as "low side") of the sides of the road on which said wheels are running, from the measuring or judging results of the skid conditions of said rear and front wheels, or of said rear wheels on the basis of the outputs of said first, second and third wheel speed sensors, or of said first and second wheel speed sensors, said low side being able to change over in accordance with said measuring or judging results at any time, combines logically the measuring or judging results of the skid conditions of said front wheels with the measuring or judging results of the skid condition of the one rear wheel running on the low side for generating the instruction for controlling said first or second fluid pressure control valve device, and generates the instruction for controlling said second or first fluid pressure control valve device, on the basis of the measuring or judging result of the skid condition of the other rear wheel running on the high side (frictionally higher side) independently of those of said front wheels.

10. An anti-skid control apparatus according to claim 9, in which said measuring or judging results of the skid conditions include a brake increasing signal, a brake maintaining or holding signal and a brake relieving signal, and the side of the one rear wheel which generates said brake maintaining signal sooner than the other rear wheel, is made "low side", before anyone of said front and rear wheels generates said brake relieving signal, or when the front wheels generate said brake maintaining signal sooner than said rear wheels both, the side of the one rear wheel whose slip is more than the other rear wheel's slip, is made "low side".

11. An anti-skid control apparatus according to claim 9, in which said measuring or judging results of the skid conditions include a brake increasing signal, a brake maintaining or holding signal and a brake relieving signal, and the side of the one rear wheel which generates said brake relieving signal sooner than the other rear wheel, is made "low side", or when the front wheels generate said brake relieving signal sooner than said rear wheels both, the side of the one rear wheel whose slip is more than the other rear wheel's slip, is made "low side".

12. An anti-skid control apparatus according to claim 9, in which said measuring or judging results of the skid conditions include a brake increasing signal, a brake maintaining or holding signal and a brake relieving signal, and the side of the one rear wheel which generates said brake maintaining signal sooner than the other rear wheel, is made "low side", before anyone of said front and rear wheels generates said brake relieving signal, or when the front wheels generate said brake maintaining signal sooner than said rear wheel both, the side of the one rear wheel whose speed is lower than the other rear wheel's speed, is made "low side".

13. An anti-skid control apparatus according to claim 9, in which said measuring or judging results of the skid conditions include a brake increasing signal, a brake maintaining or holding signal and a brake relieving signal, and the side of the one rear wheel which generates said brake relieving signal sooner than the other rear wheel, is made "low side", or when the front wheels generate said brake relieving signal sooner than said rear wheels both, the side of the one rear wheel whose speed is lower than the other rear wheel's speed, is made "low side".

14. An anti-skid control apparatus according to claim 9, in which said measuring or judging results of the skid conditions include a brake increasing signal, a brake maintaining or holding signal and a brake relieving signal, and the side of the one rear wheel which generates said brake maintaining signal sooner than the other rear wheel, is made "low side", before anyone of said front and rear wheels generates said brake relieving signal, or when the front wheels generate said brake maintaining signal sooner than said rear wheel both, the side of the one rear wheel whose deceleration is more than the other rear wheel's deceleration, is made "low side".

15. An anti-skid control apparatus according to claim 9, in which said measuring or judging results of the skid conditions include a brake increasing signal, a brake maintaining or holding signal and a brake relieving signal, and the side of the one rear wheel which generates said brake relieving signal sooner than the other rear wheel, is made "low side", or when the front wheels generates said brake relieving singal sooner than said rear wheels both, the side of the one rear wheel whose deceleration is made than the other rear wheel's deceleration, is made "low side".

16. An anti-skid control apparatus according to claim 9, in which valve apparatus for generating a fluid pressure in accordance with the lower one of the brake fluid pressures of said rear wheels controlled with said first and second fluid pressure control valve devices, is arranged between said first and second paths.

* * * * *